(12) United States Patent
Chevalier et al.

(10) Patent No.: US 8,455,099 B2
(45) Date of Patent: Jun. 4, 2013

(54) URETHANE ACRYLIC BLENDS

(75) Inventors: Sebastien G. Chevalier, Roquefort les Pins (FR); Hialan Guo, Warrington, PA (US); Jiun-Chen Wu, Princeton Junction, NJ (US)

(73) Assignee: Rohm and Haas Company, Philadelphia, PA (US)

( * ) Notice: Subject to any disclaimer, the term of this patent is extended or adjusted under 35 U.S.C. 154(b) by 495 days.

(21) Appl. No.: 12/584,527

(22) Filed: Sep. 8, 2009

(65) Prior Publication Data
US 2010/0058656 A1    Mar. 11, 2010

(30) Foreign Application Priority Data

Sep. 10, 2008   (FR) .................... 08 290852

(51) Int. Cl.
*B32B 27/40* (2006.01)
*C08L 75/00* (2006.01)
*A01G 9/14* (2006.01)

(52) U.S. Cl.
USPC ........ 428/423.1; 428/500; 428/522; 428/343; 525/454; 47/17

(58) Field of Classification Search
USPC ..... 428/423.1, 500, 522, 343; 47/17; 525/454
See application file for complete search history.

(56) References Cited

U.S. PATENT DOCUMENTS

| | | | |
|---|---|---|---|
| 4,317,890 A | 3/1982 | Goyert | |
| 4,382,991 A | 5/1983 | Pollman | |
| 5,237,001 A | 8/1993 | Piejko | |
| 5,502,106 A * | 3/1996 | LaFleur et al. | 525/57 |
| 5,539,054 A * | 7/1996 | LaFleur | 525/125 |
| 5,760,133 A | 6/1998 | Heidingsfeld | |
| 6,319,985 B1 | 11/2001 | Bruning | |
| 6,410,638 B1 | 6/2002 | Kaufhold | |
| 6,586,553 B1 | 7/2003 | Muhlfeld | |
| 2002/0055313 A1 | 5/2002 | Velpari | |
| 2003/0194566 A1 | 10/2003 | Corzani | |
| 2004/0146717 A1* | 7/2004 | Corzani et al. | 428/422.8 |
| 2009/0165371 A1 | 7/2009 | Chevalier | |

FOREIGN PATENT DOCUMENTS

| | | |
|---|---|---|
| CN | 1318590 | 10/2001 |
| EP | 0 500 259 | 8/1992 |
| EP | 1 050 560 | 11/2000 |
| JP | 09012820 | 1/1997 |
| JP | 11227124 | 8/1999 |
| JP | 2005081556 | 3/2005 |
| JP | 2005187777 | 7/2005 |
| JP | 2006328272 | 12/2006 |
| WO | WO 9855415 | 12/1998 |
| WO | 00/21900 | 4/2000 |
| WO | WO 0011900 | 4/2000 |
| WO | WO 2006/044113 | 4/2006 |
| WO | WO 2008/026229 | 3/2008 |

\* cited by examiner

*Primary Examiner* — Thao T. Tran
(74) *Attorney, Agent, or Firm* — Carl P. Hemenway

(57) ABSTRACT

There is provided a polymeric film comprising one or more thermoplastic polyurethane and one or more acrylic polymer comprising, as polymerized units, one or more hydrogen-bondable monomer.

10 Claims, No Drawings

URETHANE ACRYLIC BLENDS

BACKGROUND

This patent application claims the benefit of the earlier filed European Patent application serial number 08290852.6 filed on Sep. 10, 2008 under 37 CFR 1.55(a).

It is often desirable to use polymeric films for a wide variety of purposes.

U.S. Pat. No. 6,319,985 discloses blends of thermoplastic urethane with ethylene-propylene rubber. U.S. Pat. No. 6,319,985 discloses that such blends may be used in films.

For one example of a use to which polymeric films may be put, polymeric films may be used in forming part of the walls and/or roofs of structures or enclosures. Desirable properties of such films are optical clarity, mechanical strength, dimensional stability, and weatherability. Some films have been made in the past using expensive specialty materials. It is desirable to form blends of thermoplastic urethane polymers with other materials that may be less expensive or more easily obtained.

Acrylic polymers are easily obtained and are relatively inexpensive. It is desired to provide blends of urethanes with acrylic polymers, where the blend shows desirable levels of optical clarity, mechanical strength, dimensional stability, and weatherability.

For another example of a use to which polymeric films may be put, polymeric films may be used in graphic arts films. Some graphic arts films need to have properties similar to the properties needed by films used in forming structures or enclosures. Some graphic arts films need to have some other properties, such as, for example, conformability (i.e., ability to conform to curved surfaces) and printability (i.e., ability to adhere to printing inks), in addition to some properties also needed by films used in structures, such as, for example, weatherability. It is desired to provide blends of urethanes with acrylic polymers, where the blend shows desirable levels of conformability, and weatherability.

STATEMENT OF THE INVENTION

In a first aspect of the present invention, there is provided a polymeric film comprising one or more thermoplastic polyurethane and one or more acrylic polymer comprising, as polymerized units, one or more hydrogen-bondable monomer.

DETAILED DESCRIPTION

As used herein, when a ratio of two numbers is said to be "X:1 or higher," it is meant that the ratio has the value Y:1, where Y is equal to or greater than X. Similarly, when a ratio of two numbers is said to be "W:1 or lower," it is meant that the ratio has the value Z:1, where Z is equal to or lower than W.

As used herein, a "film" is an object that has one dimension (thickness) that is relatively small compared to the other two dimensions (length and width). The thickness of a film is 0.01 mm to 2 mm. The length and width of a film are each 1 cm or larger. The surface of a film defined by its length and width is known herein as the film's "face."

As used herein, a multilayer structure is an object made of two or more films in contact with each other. Adjacent films in a multilayer structure contact each other by having all or part of a face of one film in contact with all or part of a face of the adjacent film. Each film is a multilayer structure is known as a layer.

A "polymer," as used herein and as defined by F W Billmeyer, JR. in *Textbook of Polymer Science*, second edition, 1971, is a relatively large molecule made up of the reaction products of smaller chemical repeat units. Polymers may have structures that are linear, branched, star shaped, looped, hyperbranched, crosslinked, or a combination thereof; polymers may have a single type of repeat unit ("homopolymers") or they may have more than one type of repeat unit ("copolymers"). Copolymers may have the various types of repeat units arranged randomly, in sequence, in blocks, in other arrangements, or in any mixture or combination thereof.

Polymer molecular weights can be measured by standard methods such as, for example, size exclusion chromatography (SEC, also called gel permeation chromatography or GPC). Generally, polymers have weight-average molecular weight (Mw) of 1,000 or more. Polymers may have extremely high Mw; some polymers have Mw above 1,000,000; typical polymers have Mw of 1,000,000 or less. Some polymers are crosslinked, and crosslinked polymers are considered to have infinite Mw. Some polymers are characterized by Mn, the number-average molecular weight.

As used herein "weight of polymer" means the dry weight of polymer.

Molecules that can react with each other to form the repeat units of a polymer are known herein as "monomers."

One method of characterizing polymers is the glass transition temperature (Tg) as measured by Differential Scanning Calorimetry.

The present invention involves the use of a thermoplastic urethane polymer (also known as a thermoplastic polyurethane, or TPU). Urethane polymers are the reaction products of polyisocyanates with polyols and sometimes also with polyamines. Polyisocyanates are compounds with two or more isocyanate groups per molecule. Polyols are molecules with two or more hydroxyl groups per molecule. Polyamines are compounds with two or more amine groups per molecule.

The present invention involves the use of a urethane polymer that is thermoplastic. A thermoplastic polymer is one that is solid (either crystalline or glassy or a mixture thereof) at ordinary use temperatures (−40° C. to 60° C.) and may be melted at higher temperatures (typically, 150° C. to 250° C.) for blending with other polymers and/or for forming into a desired shape. Thermoplastic polymers may be melted and then cooled to room temperature without significant degradation or loss of properties.

Suitable TPUs may be of any type of TPU. For example, suitable TPU's may be, for example, aliphatic TPU's or aromatic TPU's or TPU's that contain at least one aliphatic component and at least one aromatic component. A component of a TPU is a polyol or a polyisocyanate or, if present, a polyamine. An aromatic component is a component that contains one or more aromatic ring. The polyol or polyols may be aliphatic polyols or aromatic polyols or a mixture thereof. The polyisocyanate or polyisocyanates may be aliphatic polyisocyanates or aromatic polyisocyanates or a mixture thereof. The polyamine or polyamines, if any is present, may be aliphatic polyamines or aromatic polyamines or a mixture thereof.

In some embodiments, one or more TPU of the present invention is aliphatic. In an aliphatic TPU, each polyisocyanate, polyol, and (if used) polyamine is aliphatic. "Aliphatic" herein means linear aliphatic, branched aliphatic, cyclic aliphatic, or mixtures thereof. Suitable polyols include, for example, aliphatic polyether polyols, aliphatic polyester polyols, and mixtures thereof. Some suitable aliphatic polyols are known as aliphatic chain extenders, which are aliphatic diols of relatively low molecular weight (less than 1,000). In some embodiments, one or more TPU is used that is made from polyols that contain one or more aliphatic polyether polyol.

In some embodiments, every TPU that is used is aliphatic.

In some embodiments, a TPU of the present invention is used that has weight-average molecular weight of 5,000 or higher; or 10,000 or higher; or 25,000 or higher; or 50,000 or higher; or 100,000 or higher. Independently, in some embodiments, a TPU of the present invention is used that has weight-average molecular weight of 2,000,000 or lower; or 1,000,000 or lower, or 500,000 or lower, or 300,000 or lower.

In some embodiments, a TPU of the present invention is used that has index of refraction of 1.3 or higher; or 1.4 or higher; or 1.45 or higher. Independently, in embodiments, a TPU of the present invention is used that has index of refraction of 1.7 or lower; or 1.6 or lower.

The present invention involves at least one acrylic polymer. As used herein, an acrylic polymer is a polymer that contains, as polymerized units, 50% or more by weight, based on the weight of the acrylic polymer, acrylic monomer. Acrylic monomers are (meth)acrylic acid, substituted or unsubstituted esters of (meth)acrylic acid, and substituted or unsubstituted amides of (meth)acrylic acid. As used herein "(meth)acrylic" means acrylic or methacrylic; "(meth)acrylate" means acrylate or methacrylate; "(meth)acrylamide" means acrylamide or methacrylamide.

One group of suitable acrylic monomers is the group of unsubstituted alkyl methacrylates. In some embodiments, one or more unsubstituted alkyl methacrylate is used that has alkyl group of 1 to 18 carbon atoms. In some embodiments, one or more unsubstituted alkyl methacrylate is used that has alkyl group of 8 or fewer carbon atoms, or 6 or fewer carbon atoms, or 4 or fewer carbon atoms. In some embodiments, methyl methacrylate is used. In some embodiments butyl methacrylate is used. In some embodiments, both methyl methacrylate and butyl methacrylate are used.

Another group of suitable acrylic monomers is the group of unsubstituted alkyl acrylates. In some embodiments, one or more unsubstituted alkyl acrylate is used that has alkyl group of 1 to 18 carbon atoms. In some embodiments, one or more unsubstituted alkyl acrylate is used that has alkyl group of 2 or more carbon atoms. In some embodiments, one or more unsubstituted alkyl acrylate is used that has alkyl group of 8 or fewer carbon atoms, or 6 or fewer carbon atoms. In some embodiments, ethyl acrylate is used. In some embodiments, butyl acrylate is used.

Another group of suitable acrylic monomers is the group of hydrogen-bondable monomers. As used herein, a hydrogen-bondable monomer is a monomer that contains a hydrogen-bondable group. A hydrogen-bondable group contains an electronegative atom covalently bound to the monomer and covalently bound to a hydrogen atom. The electronegative atom must be oxygen or nitrogen. Some suitable hydrogen-bondable monomers are, for example, amine-substituted alkyl (meth)acrylates, hydroxy-substituted alkyl (meth)acrylates, and further-substituted versions thereof. Some other examples of suitable hydrogen-bondable monomers are vinyl compounds such as, for example vinyl imidazole, n-vinyl pyrrolidone, and substituted versions thereof.

Some other examples of suitable hydrogen-bondable monomers are (meth)acrylate monomers that contain an alkylene oxide chain having 1 to 100 alkylene oxide units, including, for example, (meth)acrylate terminated poly(alkylene oxide), alkoxy poly(alkylene oxide) (meth)acrylate, (meth)acrylate terminated poly(ethylene glycol), alkoxy poly(alkylene glycol) (meth)acrylate, poly(alkylene oxide) di(meth)acrylate, and mixture thereof. Some suitable alkylene oxide units include, for example, ethylene oxide, propylene oxide, and a combination thereof. Some suitable alkoxy groups include, for example, methoxy, butoxy, and mixtures thereof. Some suitable (meth)acrylate monomers that contain an alkylene oxide chain having 1 to 100 alkylene oxide units include, for example, polyethylene oxide (meth)acrylate, polypropylene oxide (meth)acrylate, and mixtures thereof.

In some embodiments, an acrylic polymer of the present invention contains polymerized units of one or more hydroxy-substituted alkyl (meth)acrylates. In hydroxy-substituted alkyl (meth)acrylates, one or more hydroxyl group is attached to the alkyl group. In some embodiments, one or more hydroxy-substituted alkyl (meth)acrylate is used that has alkyl group of 1 to 8 carbon atoms. In some embodiments, one or more hydroxy-substituted alkyl (meth)acrylate is used that has alkyl group of 2 or more carbon atoms. In some embodiments, one or more hydroxy-substituted alkyl (meth)acrylate is used that has alkyl group of 4 or fewer carbon atoms.

In some embodiments, an acrylic polymer of the present invention contains polymerized units of one or more amine-substituted alkyl (meth)acrylates. In amine-substituted alkyl (meth)acrylates monomers, the amine may be primary, secondary, or tertiary.

In some embodiments, an acrylic polymer of the present invention contains polymerized units of one or more (meth)acrylamide. Suitable (meth)acrylamides include, for example, acrylamide, methacrylamide, and substituted versions thereof.

In some embodiments, the only hydrogen-bondable monomers used are one or more hydroxy-substituted alkyl (meth)acrylate.

In some embodiments, one or more acrylic polymer of the present invention contains, as polymerized units, one or more monomer that is not an acrylic monomer. Some suitable non-acrylic monomers include, for example, vinyl compounds. Some suitable vinyl compounds include, for example, alkenes, dienes, vinyl acetate, and vinyl aromatic compounds. In some embodiments, no alkenes are used. In some embodiments, no dienes are used.

In some embodiments, one or more vinyl aromatic compound is used. The aromatic portion of a vinyl aromatic compound may be substituted or unsubstituted. Some suitable vinyl aromatic compounds include, for example, styrene and alkyl-substituted styrenes. In some embodiments, styrene or alpha-methyl styrene or a mixture thereof is used. In some embodiments, alpha-methyl styrene is used.

In some embodiments, an acrylic polymer of the present invention includes one or more multi-functional monomer. Suitable multi-functional monomers include, for example, compounds with two or more vinyl groups. Vinyl groups may be part of a (meth)acrylate group or may be another type of vinyl group. Some suitable multifunctional monomers include, for example, allyl (meth)acrylate and compounds with two or more (meth)acrylate groups. In some embodiments, allyl methacrylate is used.

In some embodiments, an acrylic polymer of the present invention is made by a polymerization reaction that is conducted entirely or partially in the presence of a chain transfer agent. It is contemplated that the presence of chain transfer agent usually causes the polymer resulting from the polymerization reaction to have lower molecular weight that it would otherwise have. Some suitable chain transfer agents include, for example, thiol compounds having 4 to 20 carbon atoms. One suitable chain transfer agent is n-dodecane thiol.

In some embodiments, an acrylic polymer of the present invention is a single-stage polymer. In some embodiments, an acrylic polymer of the present invention is a multi-stage polymer. A multi-stage polymer is a polymer made by a process in which a first polymerization is conducted to completion or near completion, followed by one or more subsequent polymerization, each of which is conducted in the presence of the previous stage or stages, and each of which is conducted to completion or near completion. The polymer formed by the first polymerization is known as the first-stage polymer; the polymer formed by the second polymerization is known as the second stage polymer, etc. If no polymerization is conducted after completion of the first stage, the resulting polymer is known herein as a single-stage polymer.

In some embodiments, an acrylic polymer of the present invention is made by aqueous emulsion polymerization. The polymer produced by emulsion polymerization is in the form of polymer particles dispersed in water. If a multi-stage polymer is made by emulsion polymerization, it is contemplated that some or all of the second-stage polymer will form on or in the polymer particles formed by the first stage. It is further contemplated that some or all of the polymer formed in each additional stage (if any is conducted) will form on or in the polymer particles produced by the previous stages.

Among embodiments in which one or more single-stage acrylic polymer is used ("single stage embodiments"), some suitable acrylic polymers have Tg of, for example, 30° C. or higher; or 40° C.; or 50° C. or higher; or 60° C. or higher. Independently, single stage embodiments, some suitable acrylic polymers have Tg of, for example, 125° C. or lower; or 100° C. or lower; or 75° C. or lower.

Among some single stage embodiments, a suitable amount of alkyl methacrylate monomer is, for example, by weight based on the weight of that single-stage polymer, 10% or more; or 20% or more; or 40% or more. Independently, among some single stage embodiments, a suitable amount of alkyl methacrylate monomer is, for example, by weight based on the weight of that single-stage polymer, 95% or less; or 80% or less; or 70% or less.

Among some single stage embodiments, a suitable amount of alkyl acrylate monomer is, for example, by weight based on the weight of that single-stage polymer, 2% or more; or 5% or more; or 10% or more. Independently, among some single stage embodiments, a suitable amount of alkyl acrylate monomer is, for example, by weight based on the weight of that single-stage polymer, 75% or less; or 50% or less; or 35% or less.

Among some single stage embodiments, a suitable amount of vinyl aromatic monomer is, for example, by weight based on the weight of that single-stage polymer, 1% or more; or 2% or more; or 5% or more; or 8% or more. Independently, among some single stage embodiments, a suitable amount of vinyl aromatic monomer is, for example, by weight based on the weight of that single-stage polymer, 50% or less; or 30% or less; or 20% or less.

Among some single stage embodiments, a suitable amount of hydrogen-bondable monomer is, for example, by weight based on the weight of that single-stage polymer, 0.5% or more; or 1% or more; or 2% or more. Independently, among some single stage embodiments, a suitable amount of hydrogen-bondable monomer is, for example, by weight based on the weight of that single-stage polymer, 60% or less; or 45% or less; or 20% or less.

Among some single stage embodiments, a suitable amount of multi-functional monomer is, for example, by weight based on the weight of that single-stage polymer, 0.1% or more; or 0.2% or more; or 0.5% or more. Independently, among some single stage embodiments, a suitable amount of multi-functional monomer is, for example, by weight based on the weight of that single-stage polymer, 6% or less; or 4% or less; or 2% or less. In some single stage embodiments, no multi-functional monomer is used.

Among some single stage embodiments, a suitable amount of chain transfer agent is, for example, by weight based on the weight of that single-stage polymer, 0.05% or more; or 0.1% or more; or 0.2% or more. Independently, among some single stage embodiments, a suitable amount of chain transfer agent is, for example, by weight based on the weight of that single-stage polymer, 5% or less; or 3% or less; or 2.5% or less.

Among some embodiments in which a single-stage acrylic polymer is used, suitable glass transition temperature of the single-stage acrylic polymer is, for example, 30° C. or higher; or 40° C. or higher; or 50° C. or higher. Independently, among some embodiments in which a single-stage acrylic polymer is used, suitable glass transition temperature of the single-stage acrylic polymer is, for example, 120° C. or lower; or 90° C. or lower; or 70° C. or lower.

In some embodiments, every acrylic polymer is a single-stage polymer. In some embodiments, every acrylic polymer is a multi-stage polymer. In some embodiments, the acrylic polymer is a blend of one or more single-stage polymer with one or more multi-stage polymer.

Among some embodiments in which a multi-stage acrylic polymer is used, a suitable amount of alkyl methacrylate monomer in the first stage polymer, by weight based on the weight of the first stage polymer, is 50% or less; or 30% or less; or 20% or less. Independently, in some embodiments in which a multi-stage acrylic polymer is used, a suitable amount of alkyl methacrylate monomer in the first stage polymer, by weight based on the weight of the first stage polymer, is 2% or more; or 4% or more; or 8% or more. Some embodiments in which a multi-stage acrylic polymer is used employ smaller amounts of alkyl methacrylate monomer in the first stage, namely 1% or less; or 0.5% or less; or 0.2% or less; or 0%.

Among some embodiments in which a multi-stage acrylic polymer is used, a suitable amount of alkyl methacrylate monomer in the final stage polymer, by weight based on the weight of the final stage polymer, is 99% or less; or 95% or less; or 90% or less. Independently, in some embodiments in which a multi-stage acrylic polymer is used, a suitable amount of alkyl methacrylate monomer in the final stage polymer, by weight based on the weight of the final stage polymer, is 20% or more; or 40% or more; or 80% or more.

Among some embodiments in which a multi-stage acrylic polymer is used, a suitable amount of alkyl acrylate monomer in the first stage polymer, by weight based on the weight of the first stage polymer, is 95% or less; or 90% or less. Independently, in some embodiments in which a multi-stage acrylic polymer is used, a suitable amount of alkyl acrylate monomer in the first stage polymer, by weight based on the weight of the first stage polymer, is 5% or more; or 15% or more; or 20% or more; or 50% or more; or 60% or more.

Among some embodiments in which a multi-stage acrylic polymer is used, a suitable amount of alkyl acrylate monomer in the final stage polymer, by weight based on the weight of the final stage polymer, is 50% or less; or 35% or less; or 25% or less. Independently, in some embodiments in which a multi-stage acrylic polymer is used, a suitable amount of alkyl acrylate monomer in the final stage polymer, by weight based on the weight of the final stage polymer, is 0.5% or more; or 1% or more; or 2% or more.

Among some embodiments in which a multi-stage acrylic polymer is used, a suitable amount of vinyl aromatic monomer in the first stage polymer, by weight based on the weight of the first stage polymer, is 95% or less; or 85% or less; or 80% or less. Independently, in some embodiments in which a multi-stage acrylic polymer is used, a suitable amount of vinyl aromatic monomer in the first stage polymer, by weight based on the weight of the first stage polymer, is 2% or more; or 4% or more; or 8% or more; or 10% or more.

Among some embodiments in which a multi-stage acrylic polymer is used, a suitable amount of vinyl aromatic monomer in the final stage polymer, by weight based on the weight of the final stage polymer, is 50% or less; or 35% or less; or 30% or less. Independently, in some embodiments in which a multi-stage acrylic polymer is used, a suitable amount of vinyl aromatic monomer in the final stage polymer, by weight based on the weight of the final stage polymer, is 1% or more; or 2% or more; or 3% or more; or 6% or more.

Among some embodiments in which a multi-stage acrylic polymer is used, a suitable amount of multi-functional monomer in the first stage polymer, by weight based on the weight of the first stage polymer, is 5% or less; or 2.5% or less; or 1.2% or less. Independently, in some embodiments in which a multi-stage acrylic polymer is used, a suitable amount of multi-functional monomer in the first stage polymer, by weight based on the weight of the first stage polymer, is 0.1% or more; or 0.2% or more; or 0.5% or more.

Among some embodiments in which a multi-stage acrylic polymer is used, a suitable amount of multi-functional monomer in the final stage polymer, by weight based on the weight of the final stage polymer, is 5% or less; or 2% or less; or 1.5% or less; or 0%.

Among some embodiments in which a multi-stage acrylic polymer is used, a suitable amount of hydrogen-bondable monomer in the first stage polymer, by weight based on the weight of the first stage polymer, is 50% or less; or 25% or less; or 10% or less. Independently, in some embodiments in which a multi-stage acrylic polymer is used, a suitable amount of hydrogen-bondable monomer in the first stage polymer, by weight based on the weight of the first stage polymer, is 1% or more; or 2% or more; or 3% or more.

Among some embodiments in which a multi-stage acrylic polymer is used, a suitable amount of hydrogen-bondable monomer in the final stage polymer, by weight based on the weight of the final stage polymer, is 50% or less; or 25% or less; or 10% or less. Independently, in some embodiments in which a multi-stage acrylic polymer is used, a suitable amount of hydrogen-bondable monomer in the final stage polymer, by weight based on the weight of the final stage polymer, is 1% or more; or 2% or more; or 3% or more.

Among some embodiments in which a multi-stage acrylic polymer is used, a suitable amount of chain transfer agent in the production of the first stage polymer, by weight based on the weight of the first stage polymer, is 0.2% or less; or 0.1% or less; or 0%.

Among some embodiments in which a multi-stage acrylic polymer is used, a suitable amount of chain transfer agent in the production of the final stage polymer, by weight based on the weight of the final stage polymer, is 5% or less; or 2.5% or less. Independently, in some embodiments in which a multi-stage acrylic polymer is used, a suitable amount of chain transfer agent in the production of the final stage polymer, by weight based on the weight of the final stage polymer, is 0.1% or more; or 0.2% or more; or 0.5% or more. Independently, in some embodiments in which a multi-stage acrylic polymer is used, a suitable amount of chain transfer agent in the production of the final stage polymer, by weight based on the weight of the final stage polymer, is 0%.

Among some embodiments in which a multi-stage acrylic polymer is used, a suitable glass transition temperature of the first stage polymer is, for example, −60° C. or higher; or −50° C. or higher; or −40° C. or higher. Among some embodiments in which a multi-stage acrylic polymer is used, a suitable glass transition temperature of the first stage polymer is, for example, 20° C. or lower; or 15° C. or lower; or 10° C. or lower.

Among some embodiments in which a multi-stage acrylic polymer is used, a suitable glass transition temperature of the final stage polymer is, for example, 50° C. or higher; or 75° C. or higher; or 85° C. or higher. Among some embodiments in which a multi-stage acrylic polymer is used, a suitable glass transition temperature of the final stage polymer is, for example, 150° C. or lower; or 125° C. or lower.

In some embodiments in which a multi-stage polymer is used, some suitable multi-stage polymers are two-stage polymers. Independently, in some embodiments in which a multi-stage polymer is used, every multi-stage polymer is a two-stage polymer.

In some embodiments in which a multi-stage polymer is used, the ratio of the weight of the first stage polymer to the weight of the final stage polymer may be, for example, 0.5:1 or higher; or 1:1 or higher; or 1.2:1 or higher. Independently, in some embodiments in which a multi-stage polymer is used, the ratio of the weight of the first stage polymer to the weight of the final stage polymer may be, for example, 5:1 or lower; or 4:1 or lower; or 3:1 or lower; or 2.5:1 or lower.

In some embodiment, no acrylic polymer of the present invention contains polymerized units of any monomer that contains a nitrile group. Independently, in some embodiments, no acrylic polymer of the present invention contains polymerized units of any monomer that is ethylene or propylene or any unsubstituted alkene. Independently, in some embodiments, no acrylic polymer of the present invention contains polymerized units of any monomer that is a diene. Independently, in some embodiments, no acrylic polymer of the present invention contains polymerized units of any monomer that is a diene, and no acrylic polymer of the present invention contains polymerized units of any monomer that contains a nitrile group. One example of a monomer that contains a nitrile group is acrylonitrile.

In some embodiments, no acrylic polymer of the present invention contains polymerized units of acrylic acid or methacrylic acid. In some embodiment, no acrylic polymer of the present invention contains polymerized units of any monomer that contains a carboxylic acid group. In some embodiments, no acrylic polymer of the present invention contains polymerized units of any monomer that contains any acid group.

In acrylic polymers of the present invention, mixtures of suitable monomers are suitable.

In some embodiments, one desirable characteristic of the polymer film of the present invention is the optical clarity. It is contemplated that one method of enhancing optical clarity is to provide TPU and acrylic polymer that have indices of refraction equal to or nearly equal to each other. Typical TPUs have higher index of refraction than typical acrylic polymers. Therefore it is contemplated to provide acrylic polymer that has polymerized units of monomer that has higher index of refraction than is typical for acrylic polymers.

The difference between the index of refraction of an acrylic polymer of the present invention and the index of refraction of a suitable thermoplastic polyurethane may be assessed by forming a test blend of the two polymers. Such a test blend has a weight ratio of 40 parts acrylic polymer to 60 parts thermoplastic polyurethane (this ratio is used for assessing the idices of refraction; blends of other ratios are within the scope of the present invention). A film may be produced and tested as described in the Examples herein below. It is considered that a smaller the difference between the indices of refraction will lead to higher luminous transmittance of the film made from the test blend. In some embodiments, acrylic polymer and thermoplastic urethane are chosen so that such luminous transmittance is 60% or higher; or 70% or higher; or 80% or higher; or 90% or higher.

In some embodiments, an acrylic polymer of the present invention contains, as polymerized units, one or more monomer that has index of refraction of 1.490 or higher. Index of refraction of a monomer can be measured, for example, by ASTM Standard D1218-02, at 25° C. In some embodiments, an acrylic polymer of the present invention contains, as polymerized units, one or more monomer with index of refraction of 1.500 or higher; or 1.530 or higher. In some embodiments, every monomer with index of refraction of 1.49 or higher is also a vinyl aromatic monomer. In some embodiments, every vinyl aromatic monomer is a monomer that has index of refraction of 1.49 or higher.

Acrylic polymer of the present invention may be made by any polymerization method. In some embodiments, acrylic polymer of the present invention is made by aqueous emulsion polymerization, and therefore the acrylic polymer is produced in the form of a latex (i.e., polymer particles dispersed in water). In some embodiments, the mean particle size of the latex (as measured by light scattering) is 30 nm or larger; or 50 nm or larger. Independently, in some embodiments, the mean particle size of the latex is 250 nm or smaller, or 175 nm or smaller, or 125 nm or smaller, or 90 nm or smaller.

In some embodiments, the acrylic polymer of the present invention consists of a single suitable acrylic polymer. Such a single suitable acrylic polymer is, in some embodiments, a single stage polymer. Such a single polymer is, in some embodiments, a multi-stage polymer.

In some embodiments, the acrylic polymer of the present invention contains two or more suitable polymers. When two or more suitable polymers are used, every combination of types of suitable polymers is envisioned.

Some examples of suitable combinations of single-stage and/or multi-stage acrylic polymers are as follows: a single stage acrylic polymer with a multi-stage acrylic polymer; two different single-stage acrylic polymers; two different multi-stage acrylic polymers.

Some examples of suitable combinations of glass transition temperatures are as follows: one or more acrylic polymer with Tg of 20° C. or lower with one or more acrylic polymer with Tg of 25° C. or higher; two acrylic polymers, both with Tg of 20° C. or lower; two or more polymers, both with Tg of 25° C. or higher. Also contemplated is one or more multi-stage polymer in which one stage has Tg of 20° C. or lower and one stage has Tg of 25° C. or higher, possibly in combination with one or more other acrylic polymer.

Some examples of suitable combinations of acrylic polymers of various molecular weights are as follows: one or more acrylic polymer made with chain transfer agent level of 1% or more by weight based on the weight of the polymer with one or more acrylic polymer made with chain transfer agent level of 0.5% or less by weight based on the weight of the polymer; two or more acrylic polymers made with chain transfer agent level of 1% or more by weight based on the weight of the polymer; and two or more acrylic polymers made with chain transfer agent level of 0.5% or less by weight based on the weight of the polymer. Also contemplated is a multi-stage acrylic polymer in which one stage is made using chain transfer agent level of 1% or more by weight based on the weight of the polymer in that stage and in which another stage is made using chain transfer agent level of 0.5% or less by weight based on the weight of the polymer in that stage.

Among embodiments in which acrylic polymer is made by emulsion polymerization, the solid acrylic polymer may be separated from the water prior to blending the solid polymer with TPU. Separation of solid acrylic polymer from water may be accomplished by any method, including, for example, spray drying, coagulation, oven drying, freeze drying, pressing on a filter belt, suction, devolatilizing extrusion, fluid bed drying, other drying methods, and combinations thereof.

In some embodiments, the blend of the present invention involves acrylic polymer and TPU that are mixed on a microscopic scale. "Mixed on a microscopic scale," as used herein, means either that acrylic polymer and TPU are mixed intimately on a molecular scale or that if, within the blend, there exist any separate domains of either acrylic polymer or TPU, such domains have characteristic dimension of 2 micrometers or smaller. In some embodiments, domains of acrylic polymer or domains of TPU are present and have characteristic size of 1 micrometer or smaller; or 500 nanometers or smaller; or 200 nanometers or smaller.

In some embodiments, TPU in pellet or powder form is mixed with acrylic polymer in pellet or powder form. Such mixing may be conducted by any method. For example, mixing may be performed by hand at 25° C. or in a mechanical mixer at 25° C. or at elevated temperature, for example at 50° C. to 120° C. After mixing, TPU and acrylic polymer may be melted together in a melt processing apparatus such as, for example, an extruder. Sometimes, polymer melt extrusion is performed on a mixture to produce a well-mixed blend; the extrudate may, for example, be chopped into pellets of that blend.

In some embodiments, the weight ratio of TPU to acrylic polymer is 0.1:1 or higher; or 0.2:1 or higher; or 0.5:1 or higher; or 1:1 or higher. Independently, in some embodiments, the weight ratio of TPU to acrylic polymer is 10:1 or lower; or 5:1 or lower; or 3:1 or lower; or 2:1 or lower.

The film of the present invention is produced by any method. In some embodiments, the mixture of TPU and acrylic polymer is extruded, and the extrudate is formed into a film, for example by a film-blowing process.

The thickness of the film of the present invention is 0.01 mm or larger; or 0.02 mm or larger; or 0.05 mm or larger. Independently, the thickness of the film of the present invention is 2 mm or smaller; or 1 mm or smaller; or 0.5 mm or smaller; or 0.2 mm or smaller. In some embodiments, the length and width of a film of the present invention are, independent of each other, 1 cm or larger; or 10 cm or larger; or 1 meter or larger.

The film of the present invention may contain ingredients in addition to TPU and acrylic polymer. Such additional ingredients include, for example, processing aids, UV stabilizers, antiblocking agents, plasticizers, lubricants, impact modifiers, other additional ingredients, and mixtures thereof.

In some embodiments, no plasticizer is used. Plasticizers are compounds that, when added to a polymer, reduce the glass transition temperature of that polymer. Typical plasticizers are not polymers. Some common plasticizers are esters in which the alcohol group of the ester is a hydrocarbon group of 4 to 18 carbon atoms. Some typical alcohol groups are benzyl, butyl, isobutyl, and branched alkyl groups of 6 to 18 carbon atoms. Some typical acid groups are acids with two or more acid groups, such as, for example, phthalic acid, adipic acid, trimellitic acid, sebacic acid, and azelaic acid. Typically all of the acid groups are esterified. Some common plasticizers are, for example, di-2-ethylhexyl phthalate (also called dioctyl phthalate), other dialkyl phthalates with branched alkyl groups of 4 to 18 carbon atoms, and benzylbutyl phthalate. Some additional examples of plasticizers are aryl esters of alkanesulfonic acids in which the alkane group has 13 to 15 carbon atoms.

In some embodiments, no impact modifier is used. Impact modifiers are polymer particles of diameter between 50 nm and 1000 nm, containing a core of crosslinked polymer of Tg lower than 10° C. and containing a thermoplastic polymer shell of Tg higher than 30° C. In some embodiments, film of the present invention contains one or more UV stabilizer, one or more antiblocking agent, or a mixture thereof.

It is contemplated that a macroscopic layer of acrylic polymer in contact with a macroscopic layer of TPU does not constitute a blend of the present invention. A macroscopic layer, as used herein, is a layer that is 10 micrometers to 1 cm in thickness and has length and width each larger than 1 cm.

A film of the present invention may, in some embodiments, be used in a multilayer structure. In such embodiments, at least one layer of the multilayer structure is a film of the present invention. Each additional layer in the multilayer structure may or may not, independently of each other, be a film of the present invention.

In some embodiments, a film of the present invention is used that is not part of a multilayer structure.

One contemplated use for films of the present invention is as a covering for an outdoor structure. In some embodiments, all or part of the outdoor structure contains rigid supports to create a shape with large gaps between the supports. Gaps may range in size from 10 cm to 10 meters. It is contemplated that film of the present invention will be lightly stretched across such gaps and fastened to the supports. Thus the film will allow light to pass through the gaps but will not let air or water pass through in bulk. One contemplated use for such a structure is as a greenhouse for growing plants.

Another example of a contemplated use for films of the present invention part or all of a graphic arts film. Graphic arts films are films on which a visual image is apparent. A visual image may be alphanumeric characters or pictures or abstract forms or other forms any combination thereof. In some embodiments, a visual image is attached to a face of the film of the present invention, for example by printing.

Among embodiments in which a film of the present invention is used as part or all of a graphic arts film, the film of the present invention may or may not be part of a multilayer structure. Independently, the visual image may or may not be protected, for example by spraying the visual image with a fixative or by contacting the face of a transparent film to the visual image.

Among embodiments in which a film of the present invention is used as part or all of a graphic arts film, the graphic arts film may be stretchable (i.e., capable of tensile elongation of 10% or more without coming apart). In other embodiments, the graphic arts film may not be stretchable.

In some embodiments in which a film of the present invention is used as part or all of a graphic arts film, the graphic arts film is used in a way that leaves the majority of the area of both faces in contact with air. For example, such a use for a graphic arts film is as a banner. It is contemplated that some of such banners will be able to be supported by attachments near the edges and that the banner will then be able to support its own weight without undue stretching or sagging or coming apart.

In some embodiments in which a film of the present invention is used as part or all of a graphic arts film, one face of the film of the present invention is in contact with a layer of a pressure sensitive adhesive. In some of such embodiments, the graphic arts film is used by attaching the graphic arts film to a rigid substrate by putting the layer of pressure sensitive adhesive into contact with the substrate. In some of such embodiments, the rigid substrate is flat. In some of such embodiments, all or part of the rigid substrate is curved. When the substrate is curved, it is contemplated that the graphic arts film is sufficiently stretchable that it can be stretched to conform to the curvature of the rigid substrate. Suitable rigid substrates include, for example, coated or uncoated metal, coated or uncoated wood, rigid plastics, glass, painted or unpainted plaster or plasterboard, other rigid substrates, and combinations thereof. Some suitable rigid substrates are, for example, one or more exterior surface of a vehicle such as, for example, an automobile, bus, or truck. Other suitable substrates are, for example, a window, a floor, or a wall.

It is to be understood that for purposes of the present specification and claims that the range and ratio limits recited herein can be combined. For example, if ranges of 60 to 120 and 80 to 110 are recited for a particular parameter, it is understood that the ranges of 60 to 110 and 80 to 120 are also contemplated. As a further, independent, example, if a particular parameter is disclosed to have suitable minima of 1, 2, and 3, and if that parameter is disclosed to have suitable maxima of 9 and 10, then all the following ranges are contemplated: 1 to 9, 1 to 10, 2 to 9, 2 to 10, 3 to 9, and 3 to 10.

It is to be understood that for purposes of the present specification and claims that each operation disclosed herein is performed at 25° C. unless otherwise specified.

EXAMPLES

In the following Examples, films were tested by the following test methods:

The tear propagation resistance method used to test the film was ASTM method D 1922 (Elmendorf Tear) (ASTM International, West Conshohocken, Pa., USA) with a crosshead separation rate of 25.4 cm/min (10 in/min). Results are reported in grams of force.

Haze and Luminous Transmittance were tested by the method ASTM D 1003 (ASTM International, West Conshohocken, Pa., USA). Haze is the ratio of diffuse transmittance to total transmittance, expressed as a percentage.

Stress whitening test is conducted as: a thin transparent film strip was stretched with two hands, if the film turned into to white under stress, it was labeled as "−" in the table. If the film did not become white under stress, it was labeled as "+".

Creep Resistance Measurement: A film sample of 10 mm wide and 140 mm long is hung by one end. A weight is applied to the bottom to create a stress of 4 MPa. The sample is then put for 100 hours at room temperature (25° C.). The amount of creep is defined thus: $A=100 \times (L-L0)/L0$ where L=length after 100 hours, and L0 is length at the beginning. Samples with A of 30 or less are considered to "pass", while samples with A greater than 30 are considered to fail.

In the following Examples, numbers in parenthesis are parts by weight. Water was deionized water, and the following abbreviations are used:

| | |
|---|---|
| pbw = | parts by weight |
| DDBS = | 23.40% Aqueous sodium dodecylbenzenesulfonate |
| MMA = | methyl methacrylate |
| HEMA = | 2-hydroxyethyl methacrylate |
| HPMA = | hydroxypropyl methacrylate |
| EA = | Ethyl acrylate |
| aMS = | a-Methylstyrene |
| ALMA = | Allyl methacrylate |
| SFS = | Sodium formaldehyadesulfoxylate |

-continued

| | |
|---|---|
| SPS = | Sodium persulfate |
| nDDT = | n-Dodecanethiol |
| 1-SA = | single-stage acrylic polymer |
| 2-SA = | two-stage acrylic polymer |
| St.Wh.= | stress whitening |
| LT = | Luminous Transmittance |
| H = | Haze |

Example 1

Acrylic Polymer

Stage I
A Water (110.38); DDBS (5.87)
B EHA (2.40); EA (48.48); aMS (8.70); ALMA (0.4200); sodium carbonate (0.0152); DDBS (2.04); water (23.18);
C SFS (0.0060); water (2.04)
D SPS (0.0540); water (12.62)
Stage II
E MMA (33.60); HEMA (1.60); aMS (3.20); EA (1.60); sodium carbonate (0.0136); DDBS (1.36); water (12.45)
F SPS (0.0360); water (3.23)
G SPS (0.0180); water (3.27)

A reactor equipped with stirrer and condenser and blanked with nitrogen was charged with Mixture A. Into the stirred reactor heated to 88° C. were added 25% of Mixtures B, all of Mixture C, and 50% of Mixture D. After an exothermic polymerization took place and the reactor reached peak temperature, the heating and stirring were continued for 5 minutes. After adjusting the reactor temperature to 81-82° C., the remaining Mixtures B was gradually added into the reactor in 105 minutes and simultaneously the remaining Mixture D was gradually added into the reactor in 135 minutes. After the addition was completed, the reactor was kept at 81-82° C. for 60 minutes. The particle size of the emulsion was 66 nm as measured by a Brookhaven Instruments particle size analyzer BI-90. After stabilizing the reactor temperature at 81-82° C., Mixtures E and F were then gradually added into the reactor in 60 minutes. After the addition was completed, the reactor was raised to 85-86° C. Mixture G was gradually added into the reactor in 30 minutes before the reactor temperature was lowered to 80-81° C. The stirring and heating at 80-81° C. were continued for another 30 minutes before cooling the reactor to ambient temperature. The particle size of the resulting emulsion was 74 nm as measured by a Brookhaven Instruments particle size analyzer BI-90.

Example 2

Acrylic Polymer

A Water (141.67); DDBS (3.30)
B MMA (55.35); EA (22.50); nDDT (0.1500); aMS (12.00); HPMA (10.00); sodium carbonate (0.0254); DDBS (3.63); water (33.33)
C Sodium persulfate (0.0900); Water (10.51)
D Sodium formaldehyadesulfoxylate (0.0100); water (2.08)

A reactor equipped with stirrer and condenser and blanked with nitrogen was charged with Mixture A. Into the stirred reactor heated to 81° C. were added 15% of Mixtures B, 30% of Mixture C, and all of Mixture D. After an exothermic polymerization took place and the reactor reached peak temperature, the heating and stirring were continued for 5 minutes. After adjusting the reactor temperature to 81-82° C., the remaining Mixtures B was gradually added into the reactor in 120 minutes and simultaneously the remaining Mixture C was gradually added into the reactor in 150 minutes. After the addition was completed, the reactor was kept at 81-82° C. for 60 minutes before cooling the reactor to ambient temperature. The particle size of the resulting emulsion was 77 nm as measured by a Brookhaven Instruments particle size analyzer BI-90.

Example 3

Acrylic Polymer

A Water (141.67); DDBS (3.30)
B MMA (54.15); EA (22.50); nDDT (1.35); aMS (12.00); HPMA (10.00); sodium carbonate (0.0254); DDBS (3.63); Water (33.33)
C Sodium persulfate (0.0900); Water (10.51)
D Sodium formaldehyadesulfoxylate (0.0100); Water (2.08)

A reactor equipped with stirrer and condenser and blanked with nitrogen was charged with Mixture A. Into the stirred reactor heated to 81° C. were added 15% of Mixtures B, 30% of Mixture C, and all of Mixture D. After an exothermic polymerization took place and the reactor reached peak temperature, the heating and stirring were continued for 5 minutes. After adjusting the reactor temperature to 81-82° C., the remaining Mixtures B was gradually added into the reactor in 120 minutes and simultaneously the remaining Mixture C was gradually added into the reactor in 150 minutes. After the addition was completed, the reactor was kept at 81-82° C. for 60 minutes before cooling the reactor to ambient temperature. The particle size of the resulting emulsion was 75 nm as measured by a Brookhaven Instruments particle size analyzer BI-90.

Example 4

Acrylic Polymer

Stage I
A Water (138.99); DDBS (5.87);
B HEMA (4.80); EA (40.08); aMS (14.70); ALMA (0.42); sodium carbonate (0.0152); DDBS (2.04); water (23.18)
C Sodium formaldehyadesulfoxylate (0.0060); water (2.04)
D Sodium persulfate (0.0630); water (12.61)
Stage II
E MMA (31.60); HEMA (3.20); aMS (3.60); EA (1.60); sodium carbonate (0.0136); DDBS (1.36); water (12.45)
F Sodium persulfate (0.0360); Water (3.23)
G Sodium persulfate (0.0180); Water (3.27)

A reactor equipped with stirrer and condenser and blanked with nitrogen was charged with Mixture A. Into the stirred reactor heated to 82° C. were added 25% of Mixtures B, all of Mixture C, and 50% of Mixture D. After an exothermic polymerization took place and the reactor reached peak temperature, the heating and stirring were continued for 5 minutes. After adjusting the reactor temperature to 81-82° C., the remaining Mixtures B was gradually added into the reactor in 105 minutes and simultaneously the remaining Mixture D was gradually added into the reactor in 135 minutes. After the addition was completed, the reactor was kept at 81-82° C. for 60 minutes. The particle size of the emulsion was 60 nm as measured by a Brookhaven Instruments particle size analyzer BI-90. After stabilizing the reactor temperature at 81-82° C., Mixtures E and F were then gradually added into the reactor in 60 minutes. After the addition was completed, the reactor was raised to 85-86° C. Mixture G was gradually added into the reactor in 30 minutes before the reactor temperature was lowered to 80-81° C. The stirring and heating at 80-81° C. were continued for another 30 minutes before cooling the reactor to ambient temperature. The particle size of the resulting emulsion was 69 nm as measured by a Brookhaven Instruments particle size analyzer BI-90.

Example 5

Acrylic Polymer

Stage I
A Water (138.99); DDBS (5.87)
B HPMA (4.80); EA (40.08); aMS (14.70); ALMA (0.42); sodium carbonate (0.0152); DDBS (2.04); water (23.18)
C Sodium formaldehyadesulfoxylate (0.0060); water (2.04)
D Sodium persulfate (0.0630); water (12.61)
  Stage II
  E MMA (31.60); HPMA (3.20); aMS (3.60); EA (1.60); sodium carbonate (0.0136); DDBS (1.36); water (12.45)
  F Sodium persulfate (0.0360); water (3.23)
  G Sodium persulfate (0.0180); water (3.27)

A reactor equipped with stirrer and condenser and blanked with nitrogen was charged with Mixture A. Into the stirred reactor heated to 82° C. were added 25% of Mixtures B, all of Mixture C, and 50% of Mixture D. After an exothermic polymerization took place and the reactor reached peak temperature, the heating and stirring were continued for 5 minutes. After adjusting the reactor temperature to 81-82° C., the remaining Mixtures B was gradually added into the reactor in 105 minutes and simultaneously the remaining Mixture D was gradually added into the reactor in 135 minutes. After the addition was completed, the reactor was kept at 81-82° C. for 60 minutes. The particle size of the emulsion was 63 nm as measured by a Brookhaven Instruments particle size analyzer BI-90. After stabilizing the reactor temperature at 81-82° C., Mixtures E and F were then gradually added into the reactor in 60 minutes. After the addition was completed, the reactor was raised to 85-86° C. Mixture G was gradually added into the reactor in 30 minutes before the reactor temperature was lowered to 80-81° C. The stirring and heating at 80-81° C. were continued for another 30 minutes before cooling the reactor to ambient temperature. The particle size of the resulting emulsion was 73 nm as measured by a Brookhaven Instruments particle size analyzer BI-90.

Example 6

Acrylic Polymer

Stage I
A Water (138.99); DDBS (5.87)
B HPMA (4.80); EA (42.48); aMS (12.30); ALMA (0.42); sodium carbonate (0.0152); DDBS (2.04); water (23.18)
C Sodium formaldehyadesulfoxylate (0.0060); water (2.04)
D Sodium persulfate (0.0630); water (12.61)
  Stage II
  E MMA (31.54); HPMA (3.20); aMS (3.60); EA (1.6); nDDT (0.0600); sodium carbonate (0.0136); DDBS (1.36); water (12.45)
  F Sodium persulfate (0.0360); water (3.23)
  G Sodium persulfate (0.0180); water (3.27)

A reactor equipped with stirrer and condenser and blanked with nitrogen was charged with Mixture A. Into the stirred reactor heated to 82° C. were added 25% of Mixtures B, all of Mixture C, and 50% of Mixture D. After an exothermic polymerization took place and the reactor reached peak temperature, the heating and stirring were continued for 5 minutes. After adjusting the reactor temperature to 81-82° C., the remaining Mixtures B was gradually added into the reactor in 105 minutes and simultaneously the remaining Mixture D was gradually added into the reactor in 135 minutes. After the addition was completed, the reactor was kept at 81-82° C. for 60 minutes. The particle size of the emulsion was 60 nm as measured by a Brookhaven Instruments particle size analyzer BI-90. After stabilizing the reactor temperature at 81-82° C., Mixtures E and F were then gradually added into the reactor in 60 minutes. After the addition was completed, the reactor was raised to 85-86° C. Mixture G was gradually added into the reactor in 30 minutes before the reactor temperature was lowered to 80-81° C. The stirring and heating at 80-81° C. were continued for another 30 minutes before cooling the reactor to ambient temperature. The particle size of the resulting emulsion was 68 nm as measured by a Brookhaven Instruments particle size analyzer BI-90.

Example 7

Acrylic Polymer

Stage I
A Water (138.99); DDBS (5.87)
B HPMA (4.80); EA (42.48); aMS (12.30); ALMA (0.4200); sodium carbonate (0.0152); DDBS (2.04); water (23.18)
C Sodium formaldehyadesulfoxylate (0.0060); water (2.04)
D Sodium persulfate (0.0630); water (12.61)
  Stage II
  E MMA (31.06); HPMA (3.20); aMS (3.60); EA (1.60); nDDT (0.5400); sodium carbonate (0.0136); DDBS (1.36); water (12.45)
  F Sodium persulfate (0.0360); water (3.23)
  G Sodium persulfate (0.0180); water (3.27)

A reactor equipped with stirrer and condenser and blanked with nitrogen was charged with Mixture A. Into the stirred reactor heated to 82° C. were added 25% of Mixtures B, all of Mixture C, and 50% of Mixture D. After an exothermic polymerization took place and the reactor reached peak temperature, the heating and stirring were continued for 5 minutes. After adjusting the reactor temperature to 81-82° C., the remaining Mixtures B was gradually added into the reactor in 105 minutes and simultaneously the remaining Mixture D was gradually added into the reactor in 135 minutes. After the addition was completed, the reactor was kept at 81-82° C. for 60 minutes. The particle size of the emulsion was 60 nm as measured by a Brookhaven Instruments particle size analyzer BI-90. After stabilizing the reactor temperature at 81-82° C., Mixtures E and F were then gradually added into the reactor in 60 minutes. After the addition was completed, the reactor was raised to 85-86° C. Mixture G was gradually added into the reactor in 30 minutes before the reactor temperature was lowered to 80-81° C. The stirring and heating at 80-81° C. were continued for another 30 minutes before cooling the reactor to ambient temperature. The particle size of the resulting emulsion was 68 mu as measured by a Brookhaven Instruments particle size analyzer BI-90.

Example 8

Acrylic Polymer

Stage I
A Water (138.99); DDBS (5.87)
B HPMA (4.80); EA (43.38); aMS (11.40); ALMA (0.4200); sodium carbonate (0.0152); DDBS (2.04); water (23.18)

C Sodium formaldehyadesulfoxylate (0.0060); water (2.04)
D Sodium persulfate (0.0630); water (12.61)
Stage II
E MMA (21.60); HPMA (3.20); aMS (4.40); EA (10.00); nDDT (0.8000); sodium carbonate (0.0136); DDBS (1.36); water (12.45)
F Sodium persulfate (0.0360); Water (3.23)
G Sodium persulfate (0.0180); water (3.27)

A reactor equipped with stirrer and condenser and blanked with nitrogen was charged with Mixture A. Into the stirred reactor heated to 82° C. were added 25% of Mixtures B, all of Mixture C, and 50% of Mixture D. After an exothermic polymerization took place and the reactor reached peak temperature, the heating and stirring were continued for 5 minutes. After adjusting the reactor temperature to 81-82° C., the remaining Mixtures B was gradually added into the reactor in 105 minutes and simultaneously the remaining Mixture D was gradually added into the reactor in 135 minutes. After the addition was completed, the reactor was kept at 81-82° C. for 60 minutes. The particle size of the emulsion was 60 nm as measured by a Brookhaven Instruments particle size analyzer BI-90. After stabilizing the reactor temperature at 81-82° C., Mixtures E and F were then gradually added into the reactor in 60 minutes. After the addition was completed, the reactor was raised to 85-86° C. Mixture G was gradually added into the reactor in 30 minutes before the reactor temperature was lowered to 80-81° C. The stirring and heating at 80-81° C. were continued for another 30 minutes before cooling the reactor to ambient temperature. The particle size of the resulting emulsion was 66 nm as measured by a Brookhaven Instruments particle size analyzer BI-90.

Examples 9-12

Testing of Blends

Each of the above emulsions was spray dried using a lab spray dryer (NIRO Inc., Soeborg, Denmark), the powder was pelletized along with an aliphatic TPU Krystalgran™ PN 03-217 (Huntsman, Mich., USA) using a 30 mm twin screw extruder and 4 mm 2-strand die (Werner & Phleiderer, Ramsey, N.J.). The pelletizing conditions were: temperature was 190° C., feed rate was 4.5-6.8 kg/hr (10-15 lbs/hour), and RPM was 150.

| Ex. # | TPU (wt %) | 1-SA # | 1-SA (wt %) | 2-SA # | 2-SA (wt %) | LT (%) | Creep | St. Wh. |
|---|---|---|---|---|---|---|---|---|
| 9 | 60 | — | — | Ex. 1 | 40 | >91 | fail | pass |
| 10 | 60 | Ex. 2 | 30 | Ex. 4 | 10 | >91 | fail | pass |
| 11 | 60 | Ex. 3 | 30 | Ex. 4 | 10 | >91 | + | pass |
| 12 | 60 | Ex. 3 | 40 | — | — | >91 | + | pass |

All four of Examples 9-12 showed good luminous transmittance and resistance to stress whitening. Examples 11 and 12 additionally showed good creep resistance.

Examples 13-16

Testing of Blends

Krystalgran PN 03-217 (Huntsman, Mich., USA) (TPU) was blended with the above acrylic polymer powder and pelletized with a 30 mm twin screw extruder and 4 mm 2-strand die (Werner Phleiderer, New Jersey). The weight ratio of TPU and acrylic was 70:30 to 10:90. The pellets were a single layer blown film line with a 2.25 mm die (Killion, 24:1 D/L, New Jersey) to produce a single layer film.

| ID | Compositions | LT (%) | H (%) | Tear (g-f) |
|---|---|---|---|---|
| Example 13 | Ex. 5 + TPU (40:60 wt ratio) | 92.7 | 82.8 | 383 |
| Example 14 | Ex. 6 + TPU (40:60 wt ratio) | 92.9 | 91.7 | 495 |
| Example 15 | Ex. 7 + TPU (40:60 wt ratio) | 92.9 | 93.0 | 1230 |
| Example 16 | Ex. 8 + TPU (40:60 wt ratio) | 93.1 | 17.8 | — |

Examples 13-16 all showed good luminous transmittance. Example 16 also showed good lack of haze. Example 15 also showed exceptionally good tear resistance.

We claim:

1. A polymeric film comprising one or more thermoplastic polyurethane and one or more acrylic polymer comprising, as polymerized units, one or more hydrogen-bondable monomer and one or more monomer that is a vinyl aromatic compound, wherein said hydrogen-bondable monomer comprises one or more hydroxy-substituted alkyl (meth)acrylate, with the proviso that:
    when said acrylic polymer is a single stage polymer, the amount of said hydrogen-bondable monomer is 20% or less by weight based on the weight of said single-stage polymer;
    when said acrylic polymer is a multi-stage polymer, the amount of said hydrogen-bondable monomer in the final stage polymer of said multi-stage polymer is 25% or less by weight based on the weight of said final stage polymer.

2. The polymeric film of claim 1, wherein said acrylic polymer comprises no polymerized units of diene monomer.

3. The polymeric film of claim 1, wherein said acrylic polymer comprises no polymerized units of monomer containing a nitrile group.

4. The polymeric film of claim 1, wherein said acrylic polymer comprises no polymerized units of acid-functional monomer.

5. The polymeric film of claim 1, wherein said thermoplastic polyurethane is aliphatic.

6. A structure comprising one or more film of claim 1, wherein said film covers a gap between rigid supports.

7. The structure of claim 6, wherein said structure is a greenhouse.

8. A multilayer structure comprising one or more layer of a composition of claim 1 and one or more layer of a pressure-sensitive adhesive.

9. The polymeric film of claim 1, wherein said vinyl aromatic monomer comprises styrene or an alkyl-substituted styrene.

10. An outdoor structure comprising a covering made of the polymeric film of claim 1.

* * * * *